United States Patent
Dhiwar et al.

(10) Patent No.: US 10,934,861 B2
(45) Date of Patent: Mar. 2, 2021

(54) TURBINE WHEEL ASSEMBLY WITH PINNED CERAMIC MATRIX COMPOSITE BLADES

(71) Applicants: Rolls-Royce plc, London (GB); Rolls-Royce North American Technologies Inc., Indianapolis, IN (US)

(72) Inventors: Sachin Dhiwar, Chellaston (GB); Ted J. Freeman, Danville, IN (US); Thomas Martin, Derby (GB)

(73) Assignees: Rolls-Royce plc; Rolls-Royce North American Technologies Inc., Indianapolis, IN (US)

( * ) Notice: Subject to any disclaimer, the term of this patent is extended or adjusted under 35 U.S.C. 154(b) by 153 days.

(21) Appl. No.: 16/128,754

(22) Filed: Sep. 12, 2018

(65) Prior Publication Data

US 2020/0080431 A1 Mar. 12, 2020

(51) Int. Cl.
*F01D 5/30* (2006.01)
*F01D 5/28* (2006.01)
*F01D 5/22* (2006.01)

(52) U.S. Cl.
CPC .......... *F01D 5/3053* (2013.01); *F01D 5/225* (2013.01); *F01D 5/282* (2013.01); *F01D 5/303* (2013.01); *F05D 2220/323* (2013.01); *F05D 2230/60* (2013.01); *F05D 2240/20* (2013.01); *F05D 2240/80* (2013.01); *F05D 2250/231* (2013.01); *F05D 2250/70* (2013.01); *F05D 2300/6033* (2013.01)

(58) Field of Classification Search
CPC .......... F01D 5/225; F01D 5/282; F01D 5/303; F01D 5/3053; F01D 5/3084; F05D 2220/323; F05D 2230/60; F05D 2230/642; F05D 2240/20; F05D 2240/80; F05D 2250/231; F05D 2250/70; F05D 2260/30; F05D 2300/6033
See application file for complete search history.

(56) References Cited

U.S. PATENT DOCUMENTS

| | | | |
|---|---|---|---|
| 2,805,838 A * | 9/1957 | Pickup | F01D 5/30 416/95 |
| 4,084,922 A * | 4/1978 | Glenn | F01D 5/3053 416/193 A |
| 5,129,786 A | 7/1992 | Gustafson | |
| 5,405,244 A | 4/1995 | Boyd | |
| 5,435,693 A * | 7/1995 | Shaffer | F01D 5/3053 416/204 A |
| 7,661,931 B1 | 2/2010 | Matheny | |
| 7,762,781 B1 | 7/2010 | Brown et al. | |
| 8,015,705 B2 | 9/2011 | Wilson et al. | |
| 8,936,440 B2 * | 1/2015 | Alvanos | F01D 5/225 416/193 A |
| 8,951,014 B2 | 2/2015 | Corcoran et al. | |
| 9,909,430 B2 | 3/2018 | Freeman | |

(Continued)

*Primary Examiner* — Nathaniel E Wiehe
*Assistant Examiner* — Ryan C Clark
(74) *Attorney, Agent, or Firm* — Barnes & Thornburg LLP (57) ABSTRACT

A wheel assembly for a gas turbine engine includes a disk, a blade-attachment system, and a plurality of blades. The disk is configured to rotate about an axis during operation of the gas turbine engine. The blade-attachment system is configured to couple the plurality of blades with the disk for rotation therewith.

15 Claims, 7 Drawing Sheets

(56) References Cited

U.S. PATENT DOCUMENTS

| | | | |
|---|---|---|---|
| 9,963,979 B2* | 5/2018 | Freeman | ................... F01D 5/02 |
| 2016/0186569 A1 | 6/2016 | Choi | |
| 2016/0305260 A1 | 10/2016 | Freeman | |

* cited by examiner

TURBINE WHEEL ASSEMBLY WITH PINNED CERAMIC MATRIX COMPOSITE BLADES

FIELD OF THE DISCLOSURE

The present disclosure relates generally to gas turbine engines, and more specifically to wheel assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In some turbine wheels, the blades may be coupled to a disk that supports the blades in a gas path of the engine. Coupling the composite blades with disks, for example, metallic disks, can present design challenges.

SUMMARY

The present disclosure may comprise one or more of the following features and combinations thereof.

A wheel assembly for a gas turbine engine may include a metallic disk, a plurality of composite blades, and a blade-attachment system. The metallic disk may include a body arranged around an axis, a fore band that extends circumferentially about the body, and an aft band that extends circumferentially about the body. The aft band is spaced apart axially from the fore band to define a blade-receiver channel therebetween. The blade-receiver channel extends circumferentially about the body. The plurality of composite blades may be adapted to interact with gases during operation of the gas turbine engine. Each of the plurality of composite blades may include a root and an airfoil that extends radially outward away from the root. The root of each of the plurality of composite blades is located in the blade-receiver channel formed in the metallic disk. The blade-attachment system may include a plurality of pins. The plurality of pins may extend axially into the fore band, through the blade-receiver channel, and into the aft band of the metallic disk. Each of the plurality of pins may directly engage the roots of two neighboring composite blades included in the plurality of composite blades to block radial outward movement of the plurality of composite blades during operation of the gas turbine engine.

In some embodiments, each of the roots of the plurality of composite blades has a first engagement surface. Each of the plurality of pins includes a second engagement surface that may directly engage the first engagement surface of a corresponding root. The first engagement surface may be complementary to the second engagement surface. In some embodiments, each of the plurality of pins may be cylindrical.

In some embodiments, at least a portion of each of the plurality of pins may have a pie wedge shaped cross-section when viewed axially. The roots of the plurality of composite blades may be dovetail shaped when viewed axially.

In some embodiments, the blade-attachment system may include a plurality of platforms arranged circumferentially around the metallic disk to define a boundary of a flow path of the gases. The plurality of platforms may be arranged around the plurality of composite blades. Each of the plurality of pins may extend into a corresponding one of the plurality of platforms to couple the platforms with the metallic disk for rotation therewith relative to the axis. In some embodiments, each of the plurality of platforms may be located circumferentially between a neighing pair of the plurality of composite blades.

In some embodiments, each of the plurality of platforms may include an outer radial wall, a fore wall that extends radially inward away from the outer radial wall, and an aft wall that extends radially inward away from the outer radial wall. The fore wall may be formed to include an axially extending pin-receiver passage. The aft wall may be formed to include an axially extending pin-receiver passage that is offset circumferentially from the axially extending pin-receiver passage formed in the fore wall. In some embodiments, each of the plurality of pins may have a portion with a non-circular cross-section when viewed along the axis.

According to an aspect of the present disclosure, a wheel assembly for a gas turbine engine may include a disk configured for rotation about an axis, a plurality of blades arranged circumferentially around the disk, and a blade-attachment system. The blade-attachment system is configured to couple the plurality of blades with the disk. The blade-attachment system may include a plurality of platforms, a plurality of first pins, and a plurality of second pins. The plurality of platforms may be arranged around the plurality of blades to define a gas path boundary of the gas turbine engine. The plurality of first pins may extend axially into the plurality of platforms and the disk to couple the plurality of platforms with the disk for rotation therewith. The plurality of second pins may extend axially into the plurality of platforms and engage the plurality of blades to block radial outward movement of the plurality of blades during operation of the gas turbine engine.

In some embodiments, the disk may be formed to include a plurality of pin-receiver holes that extend axially through the disk. The plurality of pin-receiver holes may be spaced apart radially from an outer radial surface of the disk.

In some embodiments, the outer radial surface of the disk may be continuous and may have a circular shape when viewed axially. In some embodiments, the plurality of pin-receiver holes may include an outer ring of holes and an inner ring of holes located radially inward from the outer ring of holes.

In some embodiments, each of the plurality of blades may include a root and an airfoil that extends radially outward away from the root. Each of the plurality of second pins may directly engage the roots of two neighboring composite blades.

In some embodiments, each of the roots of the plurality of blades may have a first engagement surface. Each of the plurality of second pins may include a second engagement surface that directly engages the first engagement surface of a corresponding root. In some embodiments, the first engagement surface may be complementary to the second engagement surface.

In some embodiments, at least a portion of each of the plurality of second pins may have a pie wedge shaped cross-section when viewed axially. The roots of the plurality of blades may be dovetail shaped when viewed axially. In some embodiments, each of the plurality of second pins may be cylindrical.

In some embodiments, each of the plurality of platforms may include an outer radial wall, a fore wall that extends radially inward away from the outer radial wall, and an aft wall that extends radially inward away from the outer radial wall. The fore wall may be formed to include an axially extending pin-receiver passage. The aft wall may be formed to include an axially extending pin-receiver passage that is aligned circumferentially with the axially extending pin-receiver passage formed in the fore wall.

According to the present disclosure, a method may include a number of steps. The method may include providing a disk, a first blade, a second blade, and a pin, the disk includes a body arranged around an axis, a fore band that extends circumferentially about the body, and an aft band that extends circumferentially about the body and the aft band being spaced apart axially from the fore band to define a blade-receiver channel therebetween, locating the first blade in the blade-receiver channel formed in the disk, locating the second blade in the blade-receiver channel formed in the disk, and inserting the pin through the fore band and the aft band of the disk to cause the pin to directly engage the first blade and the second blade.

In some embodiments, the method may include providing a platform. The method may include locating the platform circumferentially between the first blade and the second blade and inserting the pin through a portion of the platform to couple the platform with the disk.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
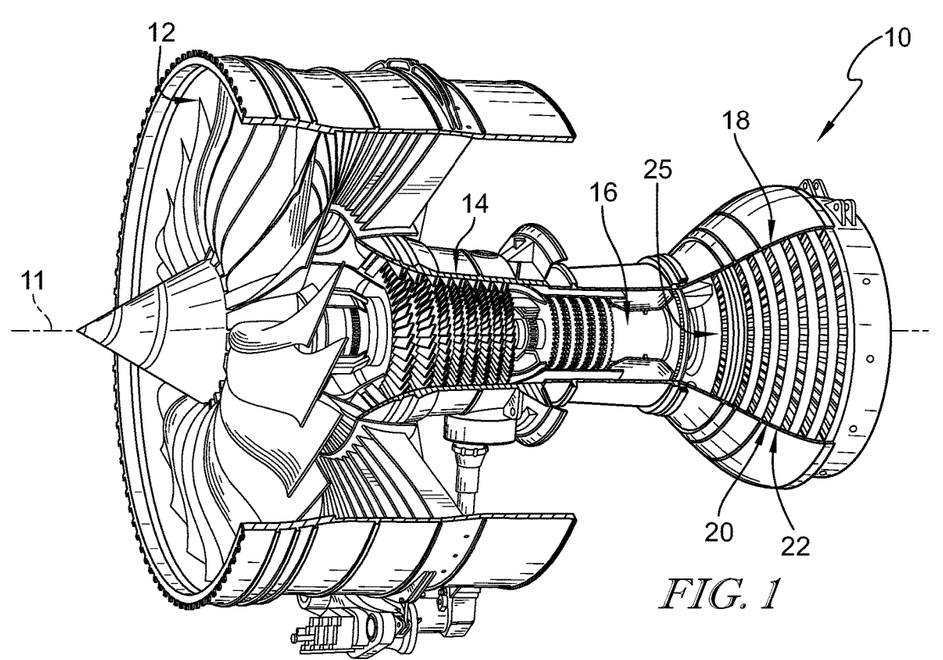
FIG. 1 is a cutaway view of a gas turbine engine that includes a fan, a compressor, a combustor, and a turbine that includes a plurality of turbine wheel assemblies in accordance with the present disclosure that are adapted to extract work from hot combustion products received from the combustor.
Figure 2:
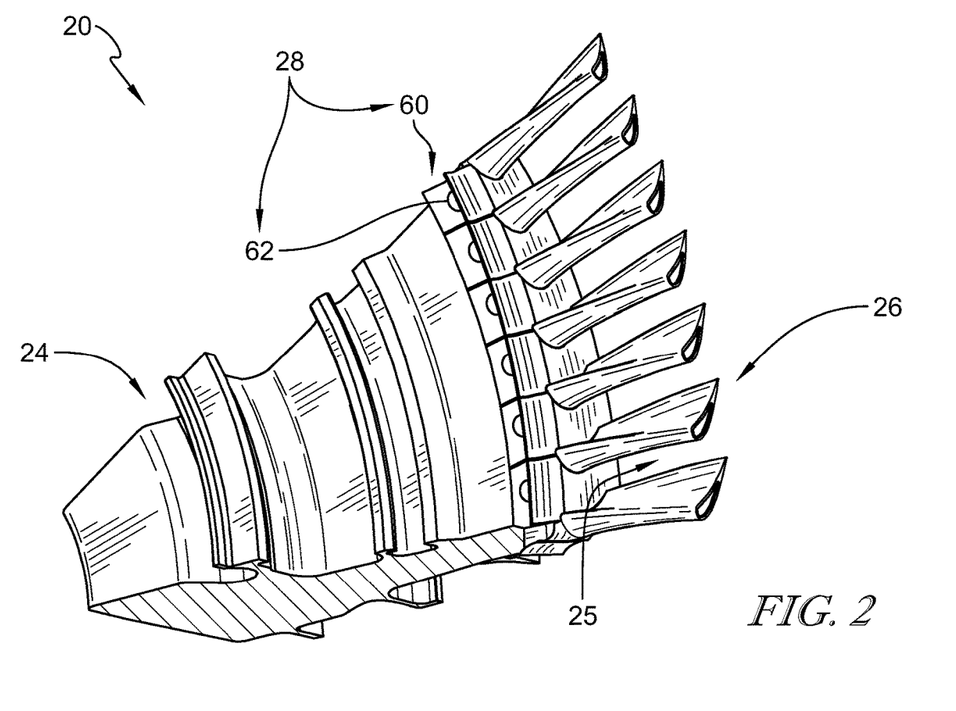
FIG. 2 is a perspective view of a portion of one of the turbine wheel assemblies included in the gas turbine engine of FIG. 1 showing that the turbine wheel assembly includes a disk, a plurality of composite blades, and a blade-attachment system for coupling the plurality of composite blades with the disk for rotation with the disk during the operation of the gas turbine engine.

A turbine wheel assembly 20 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as shown in FIG. 1. A portion of a turbine wheel assembly 20 is shown in FIG. 2. Each turbine wheel assembly 20 is configured to interact with the hot combustion gases from the combustor 16 and rotate about a center axis 11 of the gas turbine engine 10 to generate power for driving the compressor 14 and/or the fan 12. The turbine vane assembly 22 is located between turbine wheel assemblies 20 to direct gases received from an upstream turbine wheel assembly 20 toward a downstream turbine wheel assembly 20.

Figure 3:
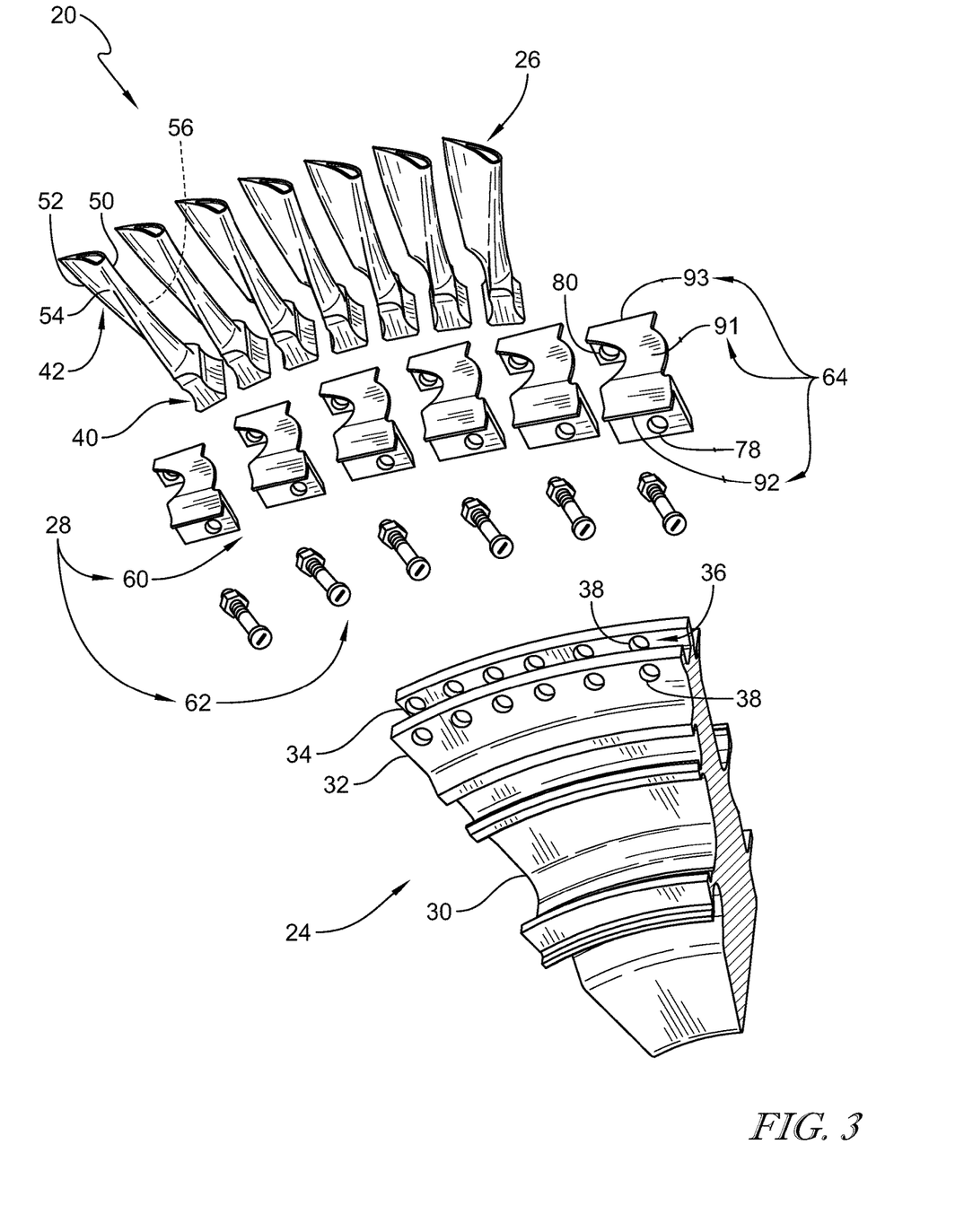
FIG. 3 is an exploded view of the turbine wheel assembly of FIG. 2 showing the disk, the plurality of composite blades, and the blade-attachment system and showing that the blade-attachment system includes a plurality of platforms arranged circumferentially around the disk to define a portion of a gas path of the gas turbine engine and a plurality of pins that extend through the disk and the platforms and engage the plurality of composite blades to couple the platforms and the composite blades with the disk.

The turbine wheel assembly 20 includes a disk 24, a plurality of composite blades 26, and a blade-attachment system 28 as shown in FIGS. 2 and 3. The disk 24 is coupled to a shaft of the engine 10 and is configured to rotate the shaft about the center axis 11 during operation of the gas turbine engine 10 to generate power. The plurality of composite blades 26 are shaped to interact with and be rotated by the hot gases that move axially along a primary gas flow path 25 of the gas turbine engine 10. The blade-attachment system 28 couples the plurality of composite blades 26 to the disk 24 for rotation with the metallic disk 24 about the center axis 11. In other embodiments, the wheel assembly 20 may be a compressor wheel assembly for use in the compressor 14.

The disk 24 includes a body 30, a fore band 32, and an aft band 34 as shown in FIGS. 2 and 3. The body 30 is arranged around the center axis 11 and the fore and aft bands 32, 34 extend circumferentially about the body 30. The aft band 34 is spaced apart axially from the fore band 32 to define a blade-receiver channel 36 therebetween. The blade-receiver channel 36 extends circumferentially about the body 30. The fore band 32 and the aft band 34 block the blades 26 from moving axially out of the blade-receiver channel 36. The disk 24 comprises metallic material in the illustrative embodiment. In the illustrative embodiment, the blade-receiver channel is U-shaped as shown in FIG. 3.

The fore band 32 and the aft band 34 are formed to include a plurality of axially extending pin-receiver holes 38 as shown in FIG. 3. The plurality of axially extending pin-receiver holes 38 are equally spaced apart and arranged circumferentially around the center axis 11. The pin-receiver holes 38 extend through the fore band 32 and the aft band 34. The pin-receiver holes 38 formed in the fore band 32 are aligned radially and circumferentially with the pin-receiver holes 38 formed in the aft band 34.

Each of the plurality of composite blades 26 includes a root 40 and an airfoil 42 as shown in FIGS. 2 and 3. The airfoil 42 extends radially away from the root 40 relative to the center axis 11. The root 40 of each blade 26 is located in the blade-receiver channel 36 formed in the metallic disk 24. The airfoils 42 are shaped to be pushed circumferentially by the hot gases moving in the primary gas flow path 25 to cause the turbine wheel assembly 20 to rotate about the center axis 11 during operation of the gas turbine engine 10.

The root 40 of each blade 26 includes a fore surface 44, an aft surface 45, a first engagement surface 46, and a second engagement surface 48 as shown in FIGS. 4-7. The aft surface 45 is spaced apart axially from the fore surface 44. The fore surface 44 and the aft surface 45 are positioned axially between the fore and aft bands 32, 34 of the disk 24 to locate the root 40 in the blade-receiver channel 36 and block axial movement of the root 40 in the blade-receiver channel 36.

Figure 4:
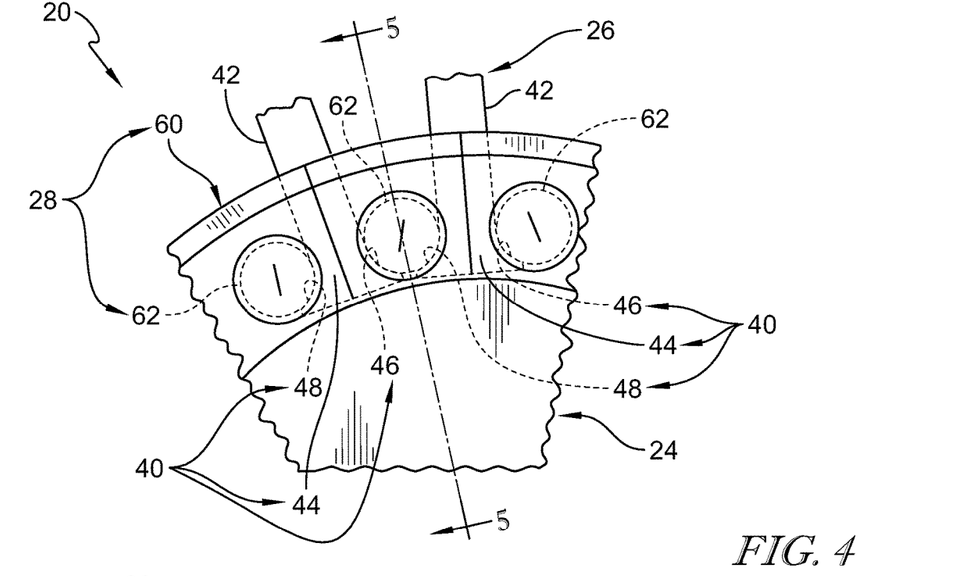
FIG. 4 is a diagrammatic side elevation view of a portion of the turbine wheel assembly of FIG. 2 showing the plurality of composite blades each include a root located in a blade-receiver channel formed in the disk and showing that each of the plurality of pins included in the blade-attachment system directly engages the roots of two neighboring composite blades to block radial outward movement of the blades during operation of the gas turbine engine.
Figure 6:
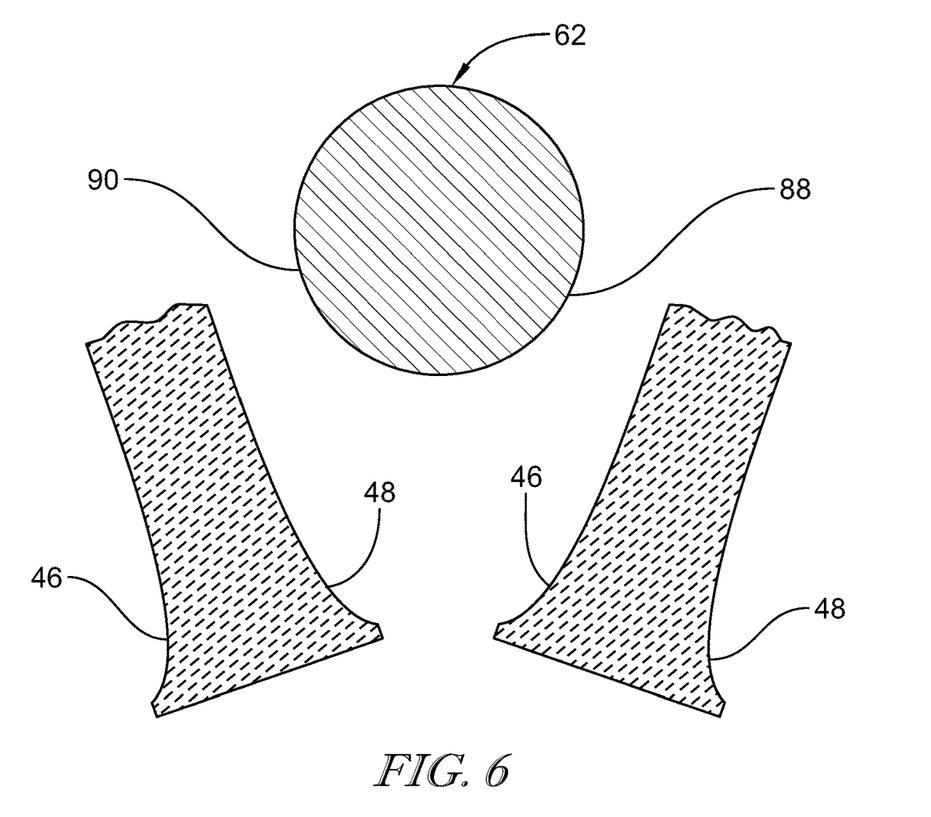
FIG. 6 is a diagrammatic view of the turbine wheel assembly of FIG. 2 showing that each of the roots of the composite blades has engagement surfaces and each of the plurality of pins has engagement surfaces that directly engage the engagement surfaces of a pair of corresponding roots.
Figure 7:
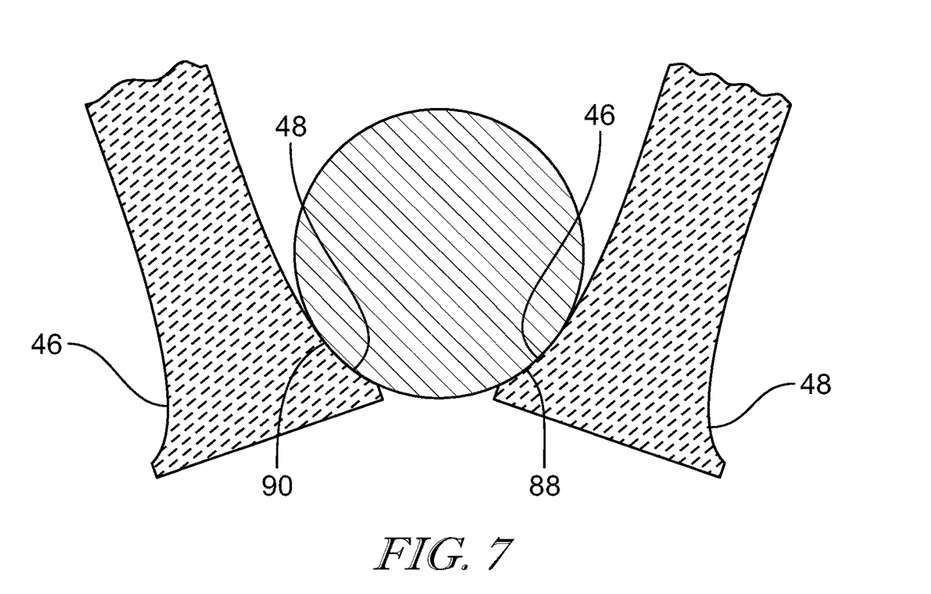
FIG. 7 is a diagrammatic view similar to FIG. 6 showing the engagement surface of the roots of the composite blades is complementary to the engagement surface the pins.

The first engagement surface 46 and the second engagement surface 48 of the blades 26 mate with a pins 62 included in the blade-attachment system 28 as suggested in FIGS. 6 and 7. The first engagement surface 46 is spaced apart circumferentially from the second engagement surface 48 as shown in FIG. 6. The first engagement surface 46 of a first blade 26 mates with a first portion of one of the pins 62 and the second engagement surface 48 of a second blade 26 mates with a second portion of the pin 62 as shown in FIG. 4. The pins 62 mate with both the first engagement surface 46 and the second engagement surface 48 of each blade 26 to block radial outward movement of the blades 26.

The airfoil 42 of each blade 26 includes a leading edge 50 and a trailing edge 52 spaced apart axially from the leading edge 50 relative to the center axis 11 as shown in FIGS. 2 and 3. The airfoil 42 further includes a pressure side 54 and a suction side 56 spaced apart circumferentially from the pressure side 54. The pressure side 54 and the suction side 56 extend axially between and interconnect the leading edge 50 and the trailing edge 52 of the airfoil 42.

Illustratively, the root 40 and airfoil 42 of each blade 26 are integrally formed such that each blade 26 is a one-piece integral component. The blades 26 comprise ceramic matrix composite materials in the illustrative embodiment. The blade 26 comprises only ceramic matrix composite materials in the illustrative embodiment. In other embodiments, the blades 26 may comprise one or more of ceramic matrix composite materials, composite materials, and metallic materials. Due to the composite materials of the blades 26, the blades 26 may weigh less than similar sized fully-metallic blades.

Figure 5:
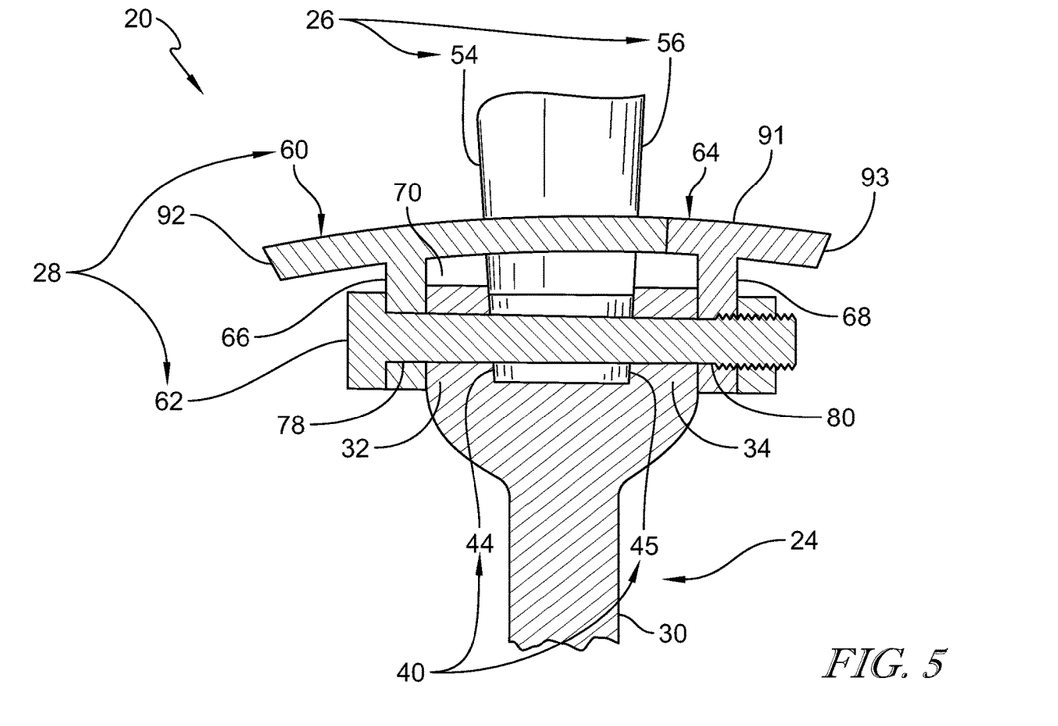
FIG. 5 is a diagrammatic cross-sectional view of the turbine wheel assembly of FIG. 4 taken along line 5-5 of FIG. 4 showing the root of a composite blade located in the blade-receiver channel and showing a pin extending into and through the platform and disk and engages the root of the composite blade to couple the composite blade to the disk.

The blade-attachment system 28 includes a plurality of platforms 60 and the plurality of pins 62 as shown in FIGS. 3-5. The plurality of platforms 60 are arranged circumferentially around the disk 24 to define a boundary of a primary gas flow path 25 of gases. The plurality of pins 62 extend into the disk 24 and mate with the roots 40 of the blades 26 to couple the blades 26 with the disk 24 for rotation with the disk 24 as suggested in FIG. 3. In the illustrative embodiment, the plurality of pins 62 extend into the disk 24 and the platforms 60 to couple the platforms 60 with the disk 24 for rotation with the disk 24.

Each of the plurality of platforms 60 is located circumferentially between a neighboring pair of the plurality of composite blades 24 as shown FIGS. 2 and 4. The platforms 60 are separate from the blades 26 in the illustrative embodiment. In other embodiments, the platforms 60 and the blades 24 may be integrally formed as a one-piece component. Illustratively, the platforms 60 are integrally formed such that each platform 60 is a one-piece integral component. The platforms 60 comprise metallic materials in the illustrative embodiment. In other embodiments, the platforms 60 comprise ceramic matrix composite materials. The platforms 60 comprise only ceramic matrix composite materials in some embodiments. In other embodiments, the platforms 60 may comprise one or more of ceramic matrix composite materials, composite materials, and metallic materials.

Each of the plurality of platforms 60 includes an outer radial wall 64, a fore wall 66, and an aft wall 68 as shown in FIG. 5. The outer radial wall 64 extends around a portion of the blade 26 to define the boundary of the primary gas flow path 25. The fore wall 66 extends radially inward away from the outer radial wall 64. The aft wall 68 extends radially inward away from the outer radial wall 64. The aft wall 68 is axially spaced apart from the fore wall 66 to define a disk receiving channel 70 between the fore wall 66 and the aft wall 68. The fore wall 66 is positioned axially outward of the fore band 32, while the aft wall 68 is positioned axially outward of the aft band 34 to locate the forward and aft bands 32, 34 of the disk 24 in the disk receiving channel 70 defined by the platform 26 as shown in FIG. 5. The aft wall 68 is partially offset from the fore wall 66 circumferentially in the illustrative embodiment.

The outer radial wall 64 includes a pressure side edge and a suction side edge as shown in FIG. 5. The pressure side edge engages with the pressure side 54 of one airfoil 42 included in the plurality of composite blades 26. The suction side edge engages with the suction side 56 of another neighboring airfoil 42. The pressure side and suction side edges are shaped to match the contour of the airfoils 42 of the plurality of composite blades 26.

The outer radial wall 64 includes a panel 91, a fore wing 92, and an aft wing 93 as shown in FIGS. 3 and 5. The panel 91 extends around a portion of a blade 26. The fore wing 92 extends axially forward away from the panel 91. The aft wing 93 extends axially rearward away from the panel 91.

The fore wall 66 is formed to include an axially extending pin-receiver passage 78 and the aft wall 68 is formed to include an axially extending pin-receiver passage 80 as shown in FIGS. 3 and 5. The axially extending pin-receiver passage 80 formed in the aft wall 68 is offset circumferentially from the axially extending pin-receiver passage 78 formed in the fore wall 66 as shown in FIG. 3. As such a pin 62 extends through the fore wall 66 of a first platform 60 and through the aft wall 68 of an adjacent platform 60. The pin-receiver passages 78, 80 are configured to align with the pin-receiver holes 38 formed in the fore and aft bands 32, 34 of the disk 24. The pin-receiver passages 78, 80 are circular in the illustrative embodiment. In other embodiments, the pin-receiver passages 78, 80 have a complementary shape with a portion of the pins 62.

The plurality of pins 62 extend axially into the fore band 32, through the blade-receiver channel 36, and into the aft band 34 of the disk 24 as shown in FIG. 5. Each of the plurality of pins 62 directly engages the roots 40 of two neighboring composite blades 26 included in the plurality of composite blades 26 to block radial outward movement of the plurality of composite blades 26 during operation of the gas turbine engine 10. Illustratively, each of the plurality of pins 62 extends into two adjacent platforms 60 to couple the platforms 60 with the disk 24 for rotation therewith relative to the center axis 11.

Illustratively, the plurality of pins 62 extend through the pin-receiver passage 78 formed in the fore wall 66 of the platform 60, through the pin-receiver holes 38 on the disk 24, and through the pin-receiver passage 80 formed in the aft wall 68 of a neighboring platform 60. Each of the plurality of pins 62 have a circular section when viewed axially in the illustrative embodiment as shown in FIG. 6.

Illustratively, the plurality of pins 62 are bolts that are retained by nuts. In other embodiments, the pins could be shafts, rods, bars of any suitable shape, etc. that are retained with other means such as c-clips or spiral lock fittings for example. The pins comprise metallic materials in the illustrative embodiment, but could comprise ceramic or ceramic matrix composite materials in other embodiments.

The plurality of pins 62 each include a first engagement surface 88 and a second engagement surface 90 as shown in FIGS. 6 and 7. The second engagement surface 90 directly engages the first engagement surface 46 of a corresponding root 40 included in the plurality of composite blades 26. The first engagement surface 46 is complementary to the second engagement surface 90 of each root 40. In the illustrative embodiment, the first engagement surface 88 and the second engagement surface 90 are both included on a tubular pin. In other embodiments, the first engagement surface 88 and the second engagement surface 90 are delimited by an edge or intermediate surface between the surfaces 88, 90.

A method of assembling the turbine wheel assembly 20 may include several steps. The method includes providing the disk 24, a first blade 26, a second blade 26, and the pin 62. The method includes locating a first blade 26 in the blade-receiver channel 36 formed in the disk 24 and locating a second blade 26 in the blade-receiver channel 36 formed in the disk 24. One of the pins 62 is inserted through the fore band 32 and the aft band 34 of the disk 24 to cause the pin 62 to engage directly the first blade 26 and the second blade 26. A second pin 62 is provided and inserted through the fore band 32 and the aft band 34 of the disk to engage directly the first blade 26 and block radial movement of the first blade 26.

The method may also include providing the platform 60 and locating the platform 60 circumferentially between the first blade 26 and the second blade 26. The method may include inserting the pin 62 through a portion of the platform 60 to couple the platform 60 with the disk 24. The portion of the platform 60 includes the pin-receiver passages 78 in the illustrative embodiment. The plurality of platforms 60 and blades 26 are coupled with the disk 24 in similar steps by inserting the plurality of pins 62 through the disk 24 and platforms 60.

Figure 8:
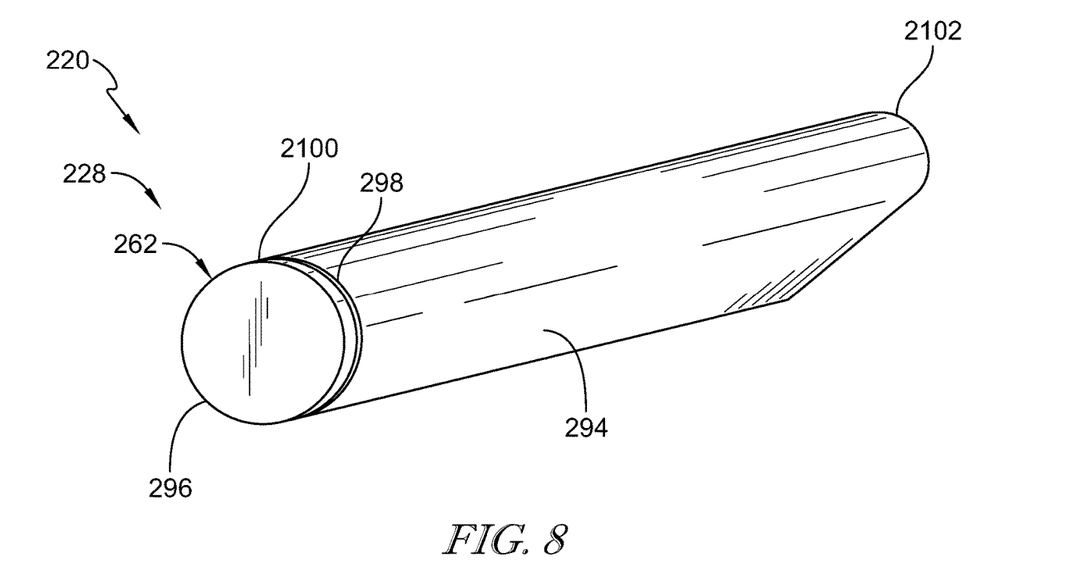
FIG. 8 is a perspective view of another embodiment of a pin adapted for use in a turbine wheel assembly of the gas turbine engine of FIG. 1 showing that a portion of each pin has a pie wedge shaped cross-section when viewed axially.
Figure 9:
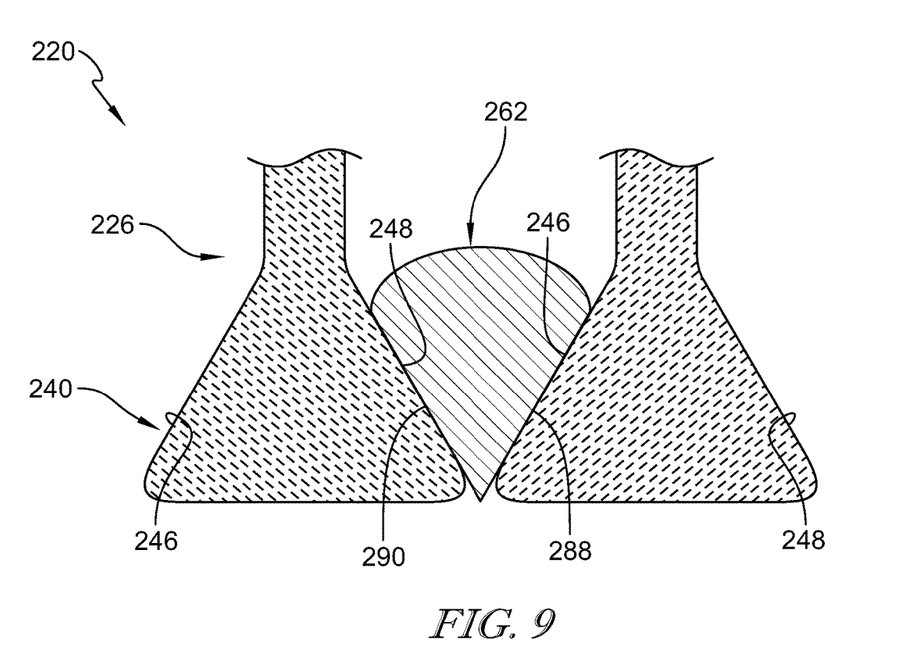
FIG. 9 is a diagrammatic cross-sectional view of the embodiment of the turbine wheel assembly of FIG. 8 showing that the roots of the composite blades are dovetail shaped when viewed axially so that the engagement surfaces of the roots and the pins are complementary.

Another embodiment of a turbine wheel assembly 220 in accordance with the present disclosure is shown in FIGS. 8 and 9. The turbine wheel assembly 220 is substantially similar to the turbine wheel assembly 20 shown in FIGS. 1-7 and described herein. Accordingly, similar reference numbers in the 200 series indicate features that are common between the turbine wheel assembly 20 and the turbine wheel assembly 220. The description of the turbine wheel assembly 20 is incorporated by reference to apply to the turbine wheel assembly 220, except in instances when it conflicts with the specific description and the drawings of the turbine wheel assembly 220.

The root 240 of each blade 226 is dovetail-shaped as shown in FIG. 9. The root 240 includes a fore surface, an aft surface, a first engagement surface 246, and a second engagement surface 248 as suggested in FIG. 9. The aft surface is spaced apart axially from the fore surface. The fore surface and the aft surface are positioned axially between the fore and aft bands 32, 34 of the disk 24 to locate the root 240 in the blade-receiver channel 36 and block axial movement of the root 240 in the blade-receiver channel 36.

The first engagement surface 246 and the second engagement surface 248 of the blades 226 mate with a pins 262 included in the blade-attachment system 228 as suggested in FIGS. 8 and 9. The first engagement surface 246 is spaced apart circumferentially from the second engagement surface 248 as shown in FIG. 9. The first engagement surface 246 of a first blade 226 mates with a first portion of one of the pins 262 and the second engagement surface 248 of a second blade 226 mates with a second portion of the pin 262 as shown in FIG. 9. The pins 262 mate with both the first engagement surface 246 and the second engagement surface 248 of each blade 226 to block radial outward movement of the blades 226.

The pin 262 included in a blade-attachment system 228 has a dovetail shaped portion (sometimes called a wedge shape) as shown in FIGS. 8 and 9. The pin 262 includes a pin body 294, a pin head 296, and a groove 298 as shown in FIG. 8. The pin body 294 has a first end 2100 and a second end 2102. The groove 298 is space axially spaced apart from the pin head 296 and is arranged to extend between and interconnect the pin head 296 to the pin body 294. The pin head 296 and the groove 298 together are configured to hold the pin 262 in place when inserted into the pin-receiver passages in the platforms. A pin retainer is coupled to the second end 2102 of the pin body 294 after the pin 262 is inserted to retain the pin 262 in place. The pin head 296 is circular in shape in the illustrative embodiment. In other embodiments, the pin head may be dovetail shaped.

The pin 262 further includes a first engagement surface 288 and a second engagement surface 290 as shown in FIG. 9. The first engagement surface 288 and the second engagement surface 290 form a portion of the pin body 294. The second engagement surface 290 directly engages the first engagement surface 246 of a corresponding root 240 included in the plurality of composite blades 226. The first engagement surface 246 is complementary to the second engagement surface 290. The second engagement surface 248 is complementary to the first engagement surface 288. In some embodiments, the engagement surface 288, 290 are planar. In some embodiments, the engagement surfaces 288, 290 are rounded.

Figure 10:
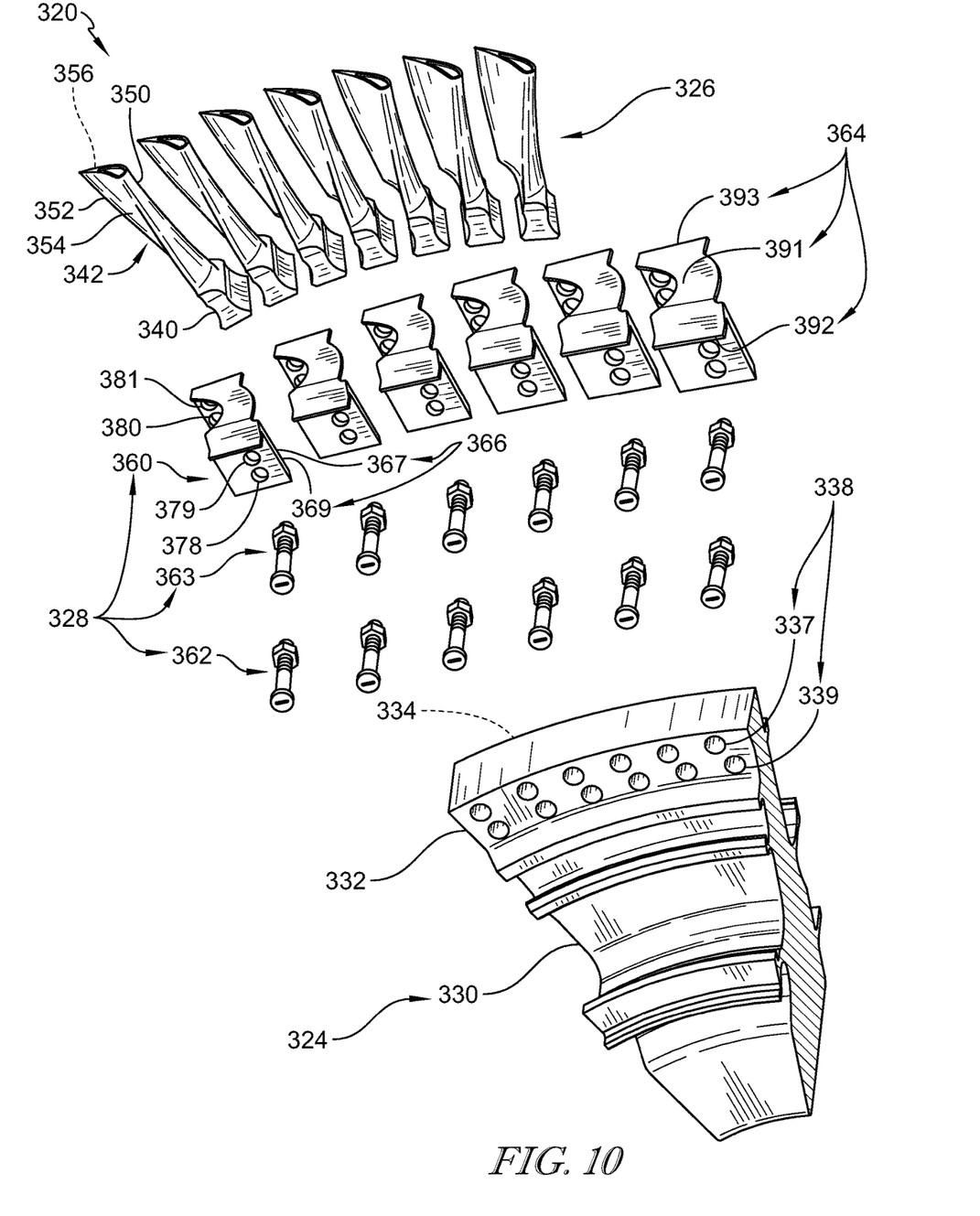
FIG. 10 is an exploded view of a portion of another embodiment of a turbine wheel assembly adapted for use in the gas turbine engine of FIG. 1 showing that the turbine wheel assembly includes a disk, a plurality of blades, and a blade-attachment system that includes a plurality of platforms, a plurality of first pins configured to couple the platforms with the disk, and a plurality of second pins configured to couple the blades with the platforms.
Figure 11:
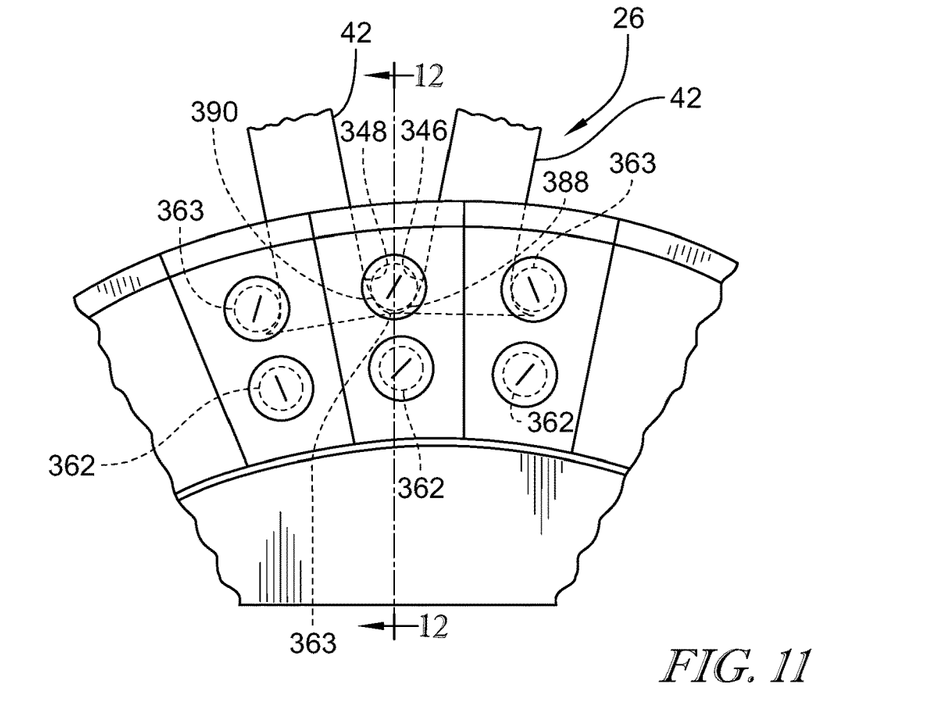
FIG. 11 is a diagrammatic side elevation view of a portion of the turbine wheel assembly of FIG. 10 showing that the plurality of blades each include a root and an airfoil and showing the plurality of second pins directly engage the roots of two neighboring blades to couple the blades with the platforms.
Figure 12:
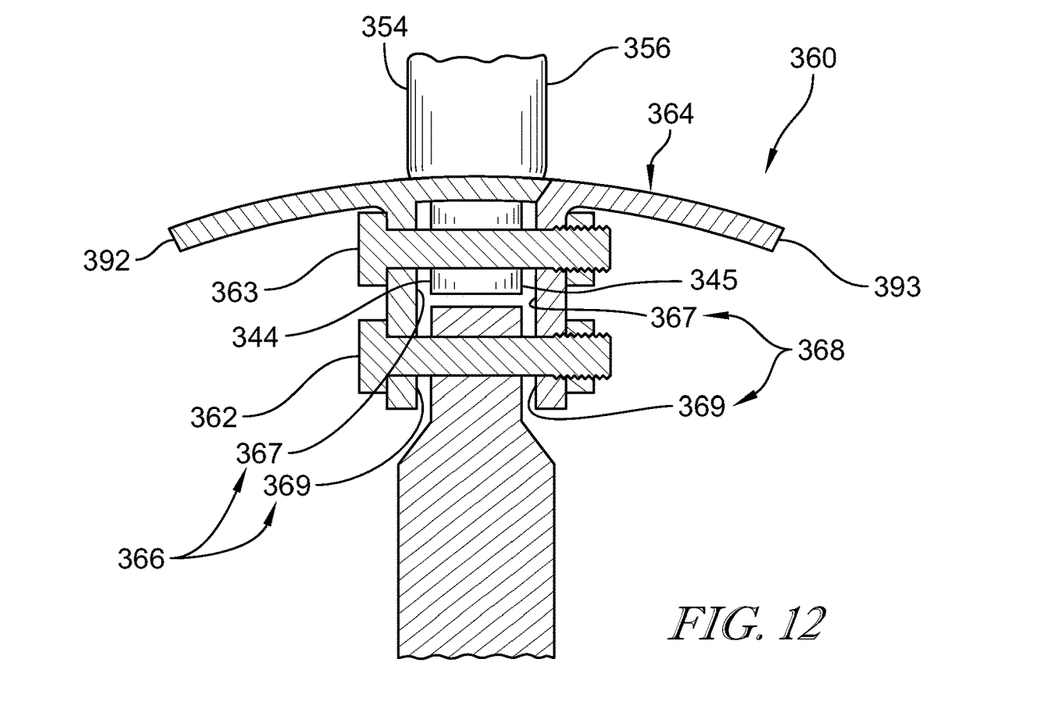
FIG. 12 is a diagrammatic cross-sectional view of the turbine wheel assembly of FIG. 11 taken along line 12-12 of FIG. 11 showing that the first pins extend axially into the plurality of platforms and the disk to couple the plurality of platforms with the disk for rotation therewith and showing that the second pins extend axially into the plurality of platforms and engages the plurality of blades to couple the blades with the platforms.

Another embodiment of a turbine wheel assembly 320 in accordance with the present disclosure is shown in FIGS. 10-12. The turbine wheel assembly 320 is substantially similar to the turbine wheel assembly 20 shown in FIGS. 1-7 and described herein. Accordingly, similar reference numbers in the 300 series indicate features that are common between the turbine wheel assembly 20 and the turbine wheel assembly 320. The description of the turbine wheel assembly 20 is incorporated by reference to apply to the turbine wheel assembly 320, except in instances when it conflicts with the specific description and the drawings of the turbine wheel assembly 320.

The turbine wheel assembly 320 includes a disk 324, a plurality of composite blades 326, and a blade-attachment system 328 as shown in FIGS. 10 and 11. The disk 324 is coupled to a shaft of the engine 10 and is configured to rotate the shaft about the center axis 11 during operation of the gas turbine engine 10 to generate power. The plurality of composite blades 326 are shaped to interact with and be rotated by the hot gases that move axially along a primary gas flow path 325 of the gas turbine engine 10. The blade-attachment system 328 couples the plurality of composite blades 326 to the disk 324 for rotation with the disk 324 about the center axis 11.

The disk 324 includes a body 330, a fore band 332, and an aft band 334 as shown in FIG. 10. The body 330 is arranged around the center axis 311 and the fore and aft bands 332, 334 extend circumferentially about the body 330. The aft band 334 is spaced apart axially from the fore band 332 to define a blade-receiver channel 336 therebetween. The disk 24 comprises metallic material in the illustrative embodiment.

The fore band 332 and the aft band 334 are formed to include a plurality of axially extending pin-receiver holes 338 as shown in FIG. 10. The plurality of axially extending pin-receiver holes 338 are equally spaced apart and arranged circumferentially around the center axis 11. The pin-receiver holes 338 extend through the fore band 332 and the aft band 334.

The plurality of pin-receiver holes 338 include a first set of pin-receiver holes 337 and a second set of pin-receiver holes 339 as shown in FIG. 10. The first set of pin-receiver holes 337 of the plurality of pin-receiver holes 338 are spaced radially from an outer radial surface of the disk 324. The second set of pin-receiver holes 339 are spaced radially inwardly of the first set of pin-receiver holes 337. In some embodiments, the second set of pin-receiver holes 339 may be offset radially from the first set of pin-receiver holes 337. The first and second sets of pin-receiver holes 337, 339 of the plurality of pin-receiver holes 338 extend completely through the fore and aft bands 332, 334 of the disk 24.

Each of the plurality of composite blades 326 includes a root 340 and an airfoil 342 as shown in FIGS. 10 and 11. The airfoil 342 extends radially away from the root 340 relative to the center axis 11. The airfoils 342 are shaped to be pushed circumferentially by the hot gases moving in the primary gas flow path 325 to cause the turbine wheel assembly 320 to rotate about the center axis 11 during operation of the gas turbine engine 10.

The root 340 of each blade 326 includes a fore surface 344, an aft surface 345, a first engagement surface 346, and a second engagement surface 348 as shown in FIGS. 11 and 12. The aft surface 345 is spaced apart axially from the fore surface 344. The fore surface 344 and the aft surface 345 are positioned axially between the fore and aft bands 332, 334 of the disk 324 to locate the root 340 on the disk 324.

The first engagement surface 346 and the second engagement surface 348 of the blades 326 mate with a pin 362 included in the blade-attachment system 328 as suggested in FIGS. 11 and 12. The first engagement surface 346 is spaced apart circumferentially from the second engagement surface 348 as shown in FIG. 11. The first engagement surface 346 of a first blade 326 mates with a first portion of one of the pins 362 and the second engagement surface 348 of a second blade 326 mates with a second portion of the pin 362 as shown in FIG. 11. The pins 362 mate with both the first engagement surface 346 and the second engagement surface 348 of each blade 326 to block radial outward movement of the blades 326.

The airfoil 342 of each blade 326 includes a leading edge 350 and a trailing edge 352 spaced apart axially from the leading edge 350 relative to the center axis 11 as shown in FIG. 10. The airfoil 342 further includes a pressure side 354 and a suction side 356 spaced apart circumferentially from the pressure side 354. The pressure side 354 and the suction side 356 extend axially between and interconnect the leading edge 350 and the trailing edge 352 of the airfoil 342.

The blade-attachment system 328 includes a plurality of platforms 360, a plurality of first pins 362, and a plurality of second pins 363 as shown in FIGS. 10-12. The plurality of platforms 360 are arranged circumferentially around the disk 324 to define a boundary of a primary gas flow path 325 of gases. The plurality of first pins 362 extend axially into the plurality of platforms 360 and the disk 324 to couple the plurality of platforms 360 with the disk 324 for rotation therewith. The plurality of second pins 363 extend axially into the plurality of platforms 360 and mate with the roots 340 of the blades 326 to couple the blades 326 with the disk 324 for rotation with the disk 324 as suggested in FIG. 11. The plurality of second pins 363 engage the plurality of blades 326 to block radial outward movement of the plurality of blades 326 during operation of the gas turbine engine 10.

Each of the plurality of platforms 360 is located circumferentially between a neighboring pair of the plurality of composite blades 324 as shown FIGS. 10 and 11. The platforms 360 are separate from the blades 326 in the illustrative embodiment. In other embodiments, the platforms 360 and the blades 324 may be integrally formed as a one-piece component. Illustratively, the platforms 360 are integrally formed such that each platform 360 is a one-piece integral component. The platforms 360 comprise metallic materials in the illustrative embodiment. In other embodiments, the platforms 360 comprise ceramic matrix composite materials. The platforms 360 comprise only ceramic matrix composite materials in some embodiments. In other embodiments, the platforms 360 may comprise one or more of ceramic matrix composite materials, composite materials, and metallic materials.

Each of the plurality of platforms 360 includes an outer radial wall 364, a fore wall 366, and an aft wall 368 as shown in FIG. 5. The outer radial wall 364 extends around a portion of the blade 326 to define the boundary of the primary gas flow path 325. The fore wall 366 extends radially inward away from the outer radial wall 364. The aft wall 368 extends radially inward away from the outer radial wall 364. The aft wall 368 is axially spaced apart from the fore wall 366 to define a disk receiving channel 370 between the fore wall 366 and the aft wall 368. The fore wall 366 is positioned axially outward of the fore band 332, while the aft wall 368 is positioned axially outward of the aft band 334 to locate the forward and aft bands 332, 334 of the disk 324 in the disk receiving channel 370 defined by the platform 360 as shown in FIG. 12.

The outer radial wall 364 includes a pressure side edge and a suction side edge as shown in FIG. 12. The pressure side edge engages with the pressure side 354 of one airfoil 342 included in the plurality of composite blades 326. The suction side edge engages with the suction side 356 of another neighboring airfoil 342. The pressure side and suction side edges are shaped to match the contour of the airfoils 342 of the plurality of composite blades 326.

The outer radial wall 364 includes a panel 391, a fore wing 392, and an aft wing 393 as shown in FIG. 10. The panel 391 extends around a portion of a blade 326. The fore wing 392 extends axially forward away from the panel 391. The aft wing 393 extends axially rearward away from the panel 391.

The fore wall 366 and the aft wall 368 both include a root interface portion 367 and a disk interface portion 369 as shown in FIGS. 10 and 12. The root interface portions 367 are aligned with the root 340 of the blade 326. The disk interface portions 369 extend radially inward from the root interface portion 367 and are aligned with the fore and aft bands 332, 334 of the disk 324.

The fore wall 366 is formed to include an axially extending pin-receiver passage 378 and the aft wall 68 is formed to include an axially extending pin-receiver passage 380 as shown in FIGS. 10 and 12. The pin-receiver passage 378 is formed in the disk interface portion 369 of the fore wall 366 and the pin-receiver passage 380 is formed in the disk interface portion 369 of the aft wall 368. The axially extending pin-receiver passage 380 formed in the aft wall 368 is offset circumferentially from the axially extending pin-receiver passage 378 formed in the fore wall 366 as shown in FIG. 10. The pin-receiver passages 378, 380 are configured to align with the pin-receiver holes 338 formed in the disk 324. The pin-receiver passages 378, 380 are circular in the illustrative embodiment. In other embodiments, the pin-receiver passages 378, 380 have a commentary shape with a portion of the first pins 362.

The fore wall 366 is also formed to include an axially extending pin-receiver passage 379 and the aft wall 368 is formed to include an axially extending pin-receiver passage 381 as shown in FIGS. 10 and 12. The pin-receiver passage 379 is formed in the root interface portion 367 of the fore wall 366 and the pin-receiver passage 381 is formed in the root interface portion 367 of the aft wall 368. The axially extending pin-receiver passage 381 formed in the aft wall 368 is offset circumferentially from the axially extending pin-receiver passage 379 formed in the fore wall 366 as shown in FIG. 10. The pin-receiver passages 379, 381 are circular in the illustrative embodiment. In other embodiments, the pin-receiver passages 379, 381 have a commentary shape with a portion of the second pins 363.

The plurality of first pins 362 extend axially into the disk interface portion 369 of the fore wall 366, through the disk 324, and into the disk interface portion 369 of the aft wall 368 as shown in FIG. 12. Each of the plurality of first pins 362 couples the plurality of platforms 360 with the disk 324.

The plurality of second pins 363 extend axially into the root interface portion 367 of the fore wall 366, through the disk receiving channel 370, and into the root interface portion 367 of the aft wall 368 as shown in FIG. 12. Each of the plurality of second pins 363 directly engages the roots 340 of two neighboring composite blades 326 included in the plurality of composite blades 326 to block radial outward movement of the plurality of composite blades 326 during operation of the gas turbine engine 10.

Illustratively, the plurality of first pins 362 extend through the pin-receiver passage 378 formed in the fore wall 366 of the platform 360, through the pin-receiver holes 338 on the disk 324, and through the pin-receiver passage 380 formed in the aft wall 368 of a neighboring platform 360. The plurality of second pins 363 extend through the pin-receiver passage 379 formed in the fore wall 366 of the platform 360, through the disk receiving channel 370, and through the pin-receiver passage 381 formed in the aft wall 368 of the neighboring platform 360. Each of the plurality of first pins 362 have a circular section when viewed axially in the illustrative embodiment as shown in FIG. 11.

Illustratively, the plurality of first and second pins 362, 363 are bolts and nuts. In other embodiments, the first and second pins 362, 363 could be other retainer means such as c-clips or spiral lock fittings. The pins 362, 363 are comprised of metallic materials in the illustrative embodiment, but could comprise ceramic composite materials in another embodiment.

The plurality of second pins 363 each include a first engagement surface 388 and a second engagement surface 390 as shown in FIGS. 6 and 7. The second engagement surface 390 directly engages the first engagement surface 346 of a corresponding root 340 included in the plurality of composite blades 326. The first engagement surface 346 is complementary to the second engagement surface 390 of each root 340.

A method of assembling the turbine wheel assembly 320 may include several steps. The method includes providing the disk 324, a first blade 326, a second blade 326, a platform 360, a first pin 362, and a second pin 363. The method may include locating the first blade 326 on the disk 324 and locating the second blade 326 on the disk 324. The method continues by locating the platform 360 circumferentially between the first blade 326 and the second blade 326.

A first pin 362 is inserted through the disk 24 to cause the first pin 362 to couple the platform 360 to the disk 324. A second pin 363 is inserted into the fore wall 366, through the disk receiving channel 370, and into the aft wall 368 of an adjacent platform 360 to cause the second pin 363 to engage directly the first blade 326 and the second blade 326. Another second pin 363 is provided and inserted into the fore wall 366, through the disk receiving channel 370, and into an aft wall 368 to engage directly the first blade 326 and block radial movement of the first blade 326.

Some approaches (e.g. fir tree arrangement) to attach a ceramic matrix composite blade to a disk may result in line contact during engine operating conditions due to different coefficients of thermal expansion between the components that occurs in the radial direction. This may result in insufficient disc to blade load bearing area to transmit the radial loading and may result in high local stresses.

By incorporating the discrete platform to hold multiple ceramic matrix composite blades and pin retention method according to the present disclosure, it may help transfer radial load through curved contact as suggested in FIG. 7 between the pin and dovetail blade root into the multiple pin section at contacts with the disc and platforms resulting in large contact area. This may reduce or eliminate high stresses at the root of the blade as compared to blades with fir tree shapes for engagement with the disc.

Either ceramic matrix composite platforms or metal platforms may be used in accordance with embodiments of the present disclosure. Mismatch in coefficients of thermal expansion at metal/ceramic matrix composite interface can be overcome through "Dual alpha zero expansion" concept along with appropriate sealing arrangement or diffusion bonding. FIG. 11 shows an embodiment where the high pressure turbine disc is constrained over the thickness of the disc.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wheel assembly for a gas turbine engine, the wheel assembly comprising
   a metallic disk that includes a body arranged around an axis, a fore band that extends circumferentially about the body, and an aft band that extends circumferentially about the body, the aft band being spaced apart axially from the fore band to define a blade-receiver channel therebetween, and the blade-receiver channel extends circumferentially about the body,
   a plurality of composite blades adapted to interact with gases during operation of the gas turbine engine, each of the plurality of composite blades include a root and an airfoil that extends radially outward away from the root, and the root of each of the plurality of composite blades is located in the blade-receiver channel formed in the metallic disk, and
   a blade-attachment system comprising (i) a plurality of pins that extend axially into the fore band, through the blade-receiver channel, and into the aft band of the metallic disk and (ii) a plurality of discrete platforms arranged circumferentially around the metallic disk to define a boundary of a flow path of the gases and each discrete platform located circumferentially between a neighboring pair of the plurality of composite blades,
   wherein each of the plurality of pins directly engages the roots of two neighboring composite blades included in the plurality of composite blades to block radial outward movement of the plurality of composite blades during operation of the gas turbine engine and each of the plurality of pins extends into a corresponding one of the plurality of discrete platforms to couple the discrete platforms with the metallic disk for rotation therewith relative to the axis.

2. The wheel assembly of claim 1, wherein each of the roots of the plurality of composite blades has a first engagement surface, each of the plurality of pins includes a second engagement surface that directly engages the first engagement surface of a corresponding root, and the first engagement surface is complementary to the second engagement surface.

3. The wheel assembly of claim 2, wherein each of the plurality of pins is cylindrical.

4. The wheel assembly of claim 2, wherein at least a portion of each of the plurality of pins has a pie wedge shaped cross-section when viewed axially and the roots of the plurality of composite blades are dovetail shaped when viewed axially.

5. A wheel assembly for a gas turbine engine, the wheel assembly comprising
   a metallic disk that includes a body arranged around an axis, a fore band that extends circumferentially about the body, and an aft band that extends circumferentially about the body, the aft band being spaced apart axially from the fore band to define a blade-receiver channel therebetween, and the blade-receiver channel extends circumferentially about the body,
   a plurality of composite blades adapted to interact with gases during operation of the gas turbine engine, each of the plurality of composite blades include a root and an airfoil that extends radially outward away from the root, and the root of each of the plurality of composite blades is located in the blade-receiver channel formed in the metallic disk, and
   a blade-attachment system comprising (i) a plurality of pins that extend axially into the fore band, through the blade-receiver channel, and into the aft band of the metallic disk and each of the plurality of pins directly engages the roots of two neighboring composite blades included in the plurality of composite blades to block radial outward movement of the plurality of composite blades during operation of the gas turbine engine and (ii) a plurality of platforms arranged circumferentially around the metallic disk to define a boundary of a flow path of the gases, the plurality of platforms arranged around the plurality of composite blades, and each of the plurality of pins extends into a corresponding one of the plurality of platforms to couple the platforms with the metallic disk for rotation therewith relative to the axis,
   wherein each of the plurality of platforms includes an outer radial wall, a fore wall that extends radially inward away from the outer radial wall, and an aft wall that extends radially inward away from the outer radial wall, the fore wall is formed to include an axially extending pin-receiver passage, and the aft wall is formed to include an axially extending pin-receiver passage that is offset circumferentially from the axially extending pin-receiver passage formed in the fore wall.

6. The wheel assembly of claim 1, wherein each of the plurality of pins has a portion with a non-circular cross-section when viewed along the axis.

7. A wheel assembly for a gas turbine engine, the wheel assembly comprising
   a disk configured for rotation about an axis, the disk formed include a plurality of pin-receiver holes that extend axially through the disk and the plurality of pin-receiver holes is spaced apart radially from an outer radial surface of the disk,
   a plurality of blades arranged circumferentially around the disk, and
   a blade-attachment system configured to couple the plurality of blades with the disk, the blade-attachment system including a plurality of platforms arranged around the plurality of blades to define a gas path boundary of the gas turbine engine, a plurality of first pins that extend axially into the plurality of platforms and the disk to couple the plurality of platforms with the disk for rotation therewith, and a plurality of second pins that extend axially into the plurality of platforms and engage the plurality of blades to block radial outward movement of the plurality of blades during operation of the gas turbine engine, wherein the plurality of pin-receiver holes includes an outer ring of holes and an inner ring of holes located radially inward from the outer ring of holes.

8. The wheel assembly of claim 7, wherein the outer radial surface of the disk is continuous and has a circular shape when viewed axially.

9. The wheel assembly of claim 7, wherein each of the plurality of blades include a root and an airfoil that extends radially outward away from the root and each of the plurality of second pins directly engages the roots of two neighboring blades.

10. The wheel assembly of claim 9, wherein each of the roots of the plurality of blades has a first engagement surface and each of the plurality of second pins includes a second engagement surface that directly engages the first engagement surface of a corresponding root.

11. The wheel assembly of claim 10, wherein the first engagement surface is complementary to the second engagement surface.

12. The wheel assembly of claim 9, wherein at least a portion of each of the plurality of second pins has a pie wedge shaped cross-section when viewed axially and the roots of the plurality of blades are dovetail shaped when viewed axially.

13. The wheel assembly of claim 7, wherein each of the plurality of second pins is cylindrical.

14. The wheel assembly of claim 7, wherein each of the plurality of platforms includes an outer radial wall, a fore wall that extends radially inward away from the outer radial wall, and an aft wall that extends radially inward away from the outer radial wall, the fore wall is formed to include an axially extending pin-receiver passage, and the aft wall is formed to include an axially extending pin-receiver passage that is aligned circumferentially with the axially extending pin-receiver passage formed in the fore wall.

15. A method comprising providing a disk, a first blade, a second blade, a discrete platform, and a pin, the disk includes a body arranged around an axis, a fore band that extends circumferentially about the body, and an aft band that extends circumferentially about the body and the aft band being spaced apart axially from the fore band to define a blade-receiver channel therebetween, locating the first blade in the blade-receiver channel formed in the disk, locating the second blade in the blade-receiver channel formed in the disk, locating the discrete platform circumferentially between the first blade and the second blade, and inserting the pin through the fore band, a portion of the discrete platform, and the aft band of the disk to cause the pin to directly engage the first blade and the second blade and to couple the discrete platform with the disk.

* * * * *